(12) United States Patent
Kadota

(10) Patent No.: US 7,903,284 B2
(45) Date of Patent: Mar. 8, 2011

(54) PRINT CONTROL DEVICE AND PROGRAM

(75) Inventor: Masatoshi Kadota, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 588 days.

(21) Appl. No.: 11/902,692

(22) Filed: Sep. 25, 2007

(65) Prior Publication Data

US 2008/0080000 A1 Apr. 3, 2008

(30) Foreign Application Priority Data

Sep. 29, 2006 (JP) ................................. 2006-266916

(51) Int. Cl.
*H04N 1/60* (2006.01)
(52) U.S. Cl. ......... 358/1.9; 358/1.13; 358/1.15; 358/2.1; 358/3.28
(58) Field of Classification Search .................. None
See application file for complete search history.

(56) References Cited

U.S. PATENT DOCUMENTS

| 5,694,222 | A | | 12/1997 | Yamada |
| 5,774,146 | A | * | 6/1998 | Mizutani ........................ 347/43 |
| 6,290,318 | B1 | * | 9/2001 | Yasukawa ...................... 347/16 |
| 6,833,852 | B1 | * | 12/2004 | Maess et al. ................... 347/188 |
| 6,865,355 | B2 | * | 3/2005 | Burkes et al. .................... 399/85 |
| 7,231,160 | B2 | * | 6/2007 | Ichikawa et al. ................. 399/82 |
| 7,408,674 | B2 | * | 8/2008 | Moro et al. ..................... 358/1.9 |
| 7,433,081 | B2 | * | 10/2008 | Hoshii ........................... 358/1.9 |
| 7,474,439 | B2 | * | 1/2009 | Uchida et al. ................... 358/1.9 |
| 7,570,375 | B2 | * | 8/2009 | Morisaki et al. ............... 358/1.13 |
| 7,623,263 | B2 | * | 11/2009 | Yoshida et al. ................. 358/1.8 |
| 2003/0202198 | A1 | * | 10/2003 | North ........................... 358/1.13 |
| 2003/0202199 | A1 | * | 10/2003 | Carter et al. .................. 358/1.13 |
| 2004/0125395 | A1 | * | 7/2004 | Onishi ........................... 358/1.13 |

(Continued)

FOREIGN PATENT DOCUMENTS

JP 8-130654 5/1996

(Continued)

OTHER PUBLICATIONS

Japanese Notification of Reasons of Rejection, w/ English translation thereof, issued in Japanese Patent Application No. JP 2006-266916 dated on Oct. 21, 2008.

*Primary Examiner* — Mark K Zimmerman
*Assistant Examiner* — Dung D Tran
(74) *Attorney, Agent, or Firm* — Banner & Witcoff, Ltd.

(57) ABSTRACT

A print control device, controlling a printing device (capable of color printing and monochrome printing) to make the printing device print an image corresponding to print target data. The print device includes a main data color/monochrome judgment unit which judges whether main data (included in the print target data which is made up of the main data and attached data) is color data when the print target data is specified, and a color restriction print control unit which makes the printing device execute the printing of the image corresponding to the print target data by the color printing when the main data is judged to be color data by the main data color/monochrome judgment unit, while making the printing device execute the printing by the monochrome printing irrespective of whether the attached data is color data or not when the main data is judged not to be color data.

16 Claims, 8 Drawing Sheets

U.S. PATENT DOCUMENTS

| | | | |
|---|---|---|---|
| 2005/0068586 A1* | 3/2005 | Sano | 358/2.1 |
| 2006/0147236 A1* | 7/2006 | Uchida et al. | 400/62 |

FOREIGN PATENT DOCUMENTS

| | | |
|---|---|---|
| JP | 2001-045272 A | 2/2001 |
| JP | 2003-175651 A | 6/2003 |
| JP | 2003-308201 A | 10/2003 |
| JP | 2004-348630 A | 12/2004 |
| JP | 2005-142630 A | 6/2005 |
| JP | 2005-301613 A | 10/2005 |
| JP | 2006-212930 A | 8/2006 |
| JP | 2006-254355 A | 9/2006 |

* cited by examiner

PRINT SETTING

BASIC SETTING | DETAILED SETTING | ... | ...

- SHEET SIZE: A4 — P11
- PAGE LAYOUT: Normal — P12
- [COLOR PRINTING RESTRICTION] — P17
- ORIENTATION: ● Portrait  ○ Landscape — P13
- NUMBER OF COPIES: 1 — P14
- SHEET TYPE: PLAIN PAPER — P15
- ☑ MONOCHROME PRINTING — P16

[OK]  [CANCEL]

- P21: ☑ WATERMARK PRINTING
- P22: FOR COMPANY USE ONLY / CONFIDENTIAL / COPY / ...
- P24: [EDIT]
- P25: [DELETE]
- P23: [ADD]
- P26: ☑ DATE/TIME PRINTING
  - POSITION OF PRINTING: UPPER RIGHT — P27
  - FONT: ... — P28    COLOR: BLACK — P29

COLOR PRINTING RESTRICTION SERVICE SETTING

- P31: ☑ ENABLE COLOR PRINTING RESTRICTION SERVICE
- P32: ☑ SET DRAWING CONDITIONS
- P33: ☐ DISREGARD BACKGROUND COLOR
- P34: ☑ DISREGARD CHARACTER COLOR OF PRINT DATE/TIME
- P35: ☑ DISREGARD COLOR OF WATERMARK
- P36: ☐ DO NOT DISREGARD COLOR ON SPECIFIC SHEETS

[OK] — P37
[CANCEL] — P38

FIG.3C

PRINT CONTROL DEVICE AND PROGRAM

CROSS-REFERENCE TO RELATED APPLICATIONS

This application claims priority from Japanese Patent Application No. 2006-266916, filed on Sep. 29, 2006, the entire subject matter of which is incorporated herein by reference.

BACKGROUND

1. Technical Field

The present invention relates to a print control device and a program for controlling a printing device (capable of switching its printing method between color printing and monochrome printing) to make the printing device print out an image corresponding to print target data specified from outside.

2. Related Art

Color printing devices, equipped with color materials (inks, toners, etc.) of multiple colors and realizing color printing by the combined use of the multiple color materials, are widely known today. Among such color printing devices, those equipped with a black material so as to execute the printing (on a sheet of paper, etc.) just using the black material in cases of monochrome printing (while using multiple color materials in cases of color printing) are well known.

Meanwhile, among print control devices for controlling a printing device capable of switching its printing method between the color printing and the monochrome printing, a well-known print control device is configured to instruct the printing device to print out the print target data by the monochrome printing (irrespective of whether the print target data is color data or monochrome data) when a monochrome printing instruction is received from the user.

Since the running cost for the color printing is higher than that for the monochrome printing, there have been proposed print control devices that place restrictions on the color printing. For example, some of such print control devices are designed to reduce the running cost of the printing device by instructing the printing device to print out the print target data (specified by a user) by the color printing when the user has color printing authority (the authority to use the color printing function) while instructing the printing device to print out the print target data by the monochrome printing when the user does not have the color printing authority. Examples of such a printing device are disclosed in Japanese Patent Provisional Publications Nos. P2004-348630A, P2005-301613A and HEI 08-130654.

The above print control devices, restricting the execution of the color printing depending on the user, are capable of reducing average processing time of the printing device since the color printing takes more time to form the print image on a sheet compared to the monochrome printing. Further, thanks to the reduction of the average processing time, the printing device is prevented from holding unprocessed print jobs for a long time.

However, if a print control device is configured as above to instruct the printing device to execute the printing of the print target data necessarily by the monochrome printing when the user (specifying the print target data) does not have the color printing authority, serious dissatisfaction can be caused to such users. Further, in cases where the printing device is used for business purposes, not giving the color printing authority can cause disadvantages in work to numbers of employees.

Thus, the above method giving the color printing authority to particular users only is insufficient for properly reducing the running cost and the average processing time of a printing device without causing the disadvantages in work.

SUMMARY OF THE INVENTION

The present invention which has been made in consideration of the above problems is advantageous in that a print control device and a program, capable of properly making a printing device (having the color printing function and the monochrome printing function) execute the printing of images according to various data by reducing the frequency of execution of the color printing (with high running cost and low printing speed) while employing the color printing function as needed, can be provided. Specifically, according to the present invention, there are provided a print control device and a program capable of properly making the printing device execute the printing of the print target data by appropriately switching the printing method between the color printing and the monochrome printing depending on the composition of the print target data.

In accordance with an aspect of the present invention, there is provided a print control device for controlling a printing device, that is capable of switching its printing method between color printing and monochrome printing, to make the printing device print an image corresponding to print target data specified from outside on a sheet, comprising: a main data color/monochrome judgment unit which judges whether main data, included in the print target data which is made up of the main data and attached data, is color data or not when the print target data is specified from outside, and a color restriction print control unit which makes the printing device execute the printing of the image corresponding to the print target data on the sheet by the color printing when the main data is judged to be color data by the main data color/monochrome judgment unit, while making the printing device execute the printing by the monochrome printing irrespective of whether the attached data is color data or not when the main data is judged not to be color data by the main data color/monochrome judgment unit.

By such a print control device, the printing device can be controlled to properly execute the printing of the print target data while restricting the execution of the color printing since the switching of the printing method between the color printing and the monochrome printing has substantially no ill effect on the printed image corresponding to the main data. Since the value of the printed matter is hardly deteriorated by the switching from the color printing to the monochrome printing (in the case where the main data is monochrome data), the user dissatisfaction with the quality of the printout can substantially be avoided and the possibility of causing disadvantages (due to the color printing restriction) to the user during work/business using the printed matter can be reduced, while successfully achieving the reduction of the running cost of the printing device.

As above, the print control device is capable of desirably making the printing device execute the printing of the print target data by properly switching the printing method between the color printing and the monochrome printing depending on the composition of the print target data while appropriately reducing the frequency of execution of the color printing (with higher running cost and lower printing speed compared to the monochrome printing).

In accordance with another aspect of the present invention, there is provided a computer program product comprising computer-readable instructions that cause a computer of an information processing device, that can communicate with a printing device capable of switching its printing method between color printing and monochrome printing, to implement: a main data color/monochrome judgment system configured to judge whether main data, included in print target data which is made up of the main data and attached data, is color data or not when the print target data is specified from outside, and a color restriction print control function of making the printing device execute the printing of an image corresponding to the print target data on a sheet by the color printing when the main data is judged to be color data by the main data color/monochrome judgment function, while making the printing device execute the printing by the monochrome printing irrespective of whether the attached data is color data or not when the main data is judged not to be color data by the main data color/monochrome judgment function.

With the computer program products configured as above, the computer of the information processing device can be controlled to operate as the print control device described above, and effects similar to those of the print control devices described above can be achieved.

BRIEF DESCRIPTION OF THE ACCOMPANYING DRAWINGS

The objects and features of the present invention will become more apparent from the consideration of the following detailed description taken in conjunction with the accompanying drawings.

FIG. 3A is a screen image showing the composition of a print setting dialog which is displayed on a display unit of an information processing device included in the printing system of FIG. 1.

FIG. 3B is a screen image showing the composition of a "detailed setting" tab sheet which is included in the print setting dialog.

FIG. 3C is a screen image showing the composition of a color printing restriction service setting dialog.

DETAILED DESCRIPTION OF THE EMBODIMENTS

<General Overview>

Figure 1:
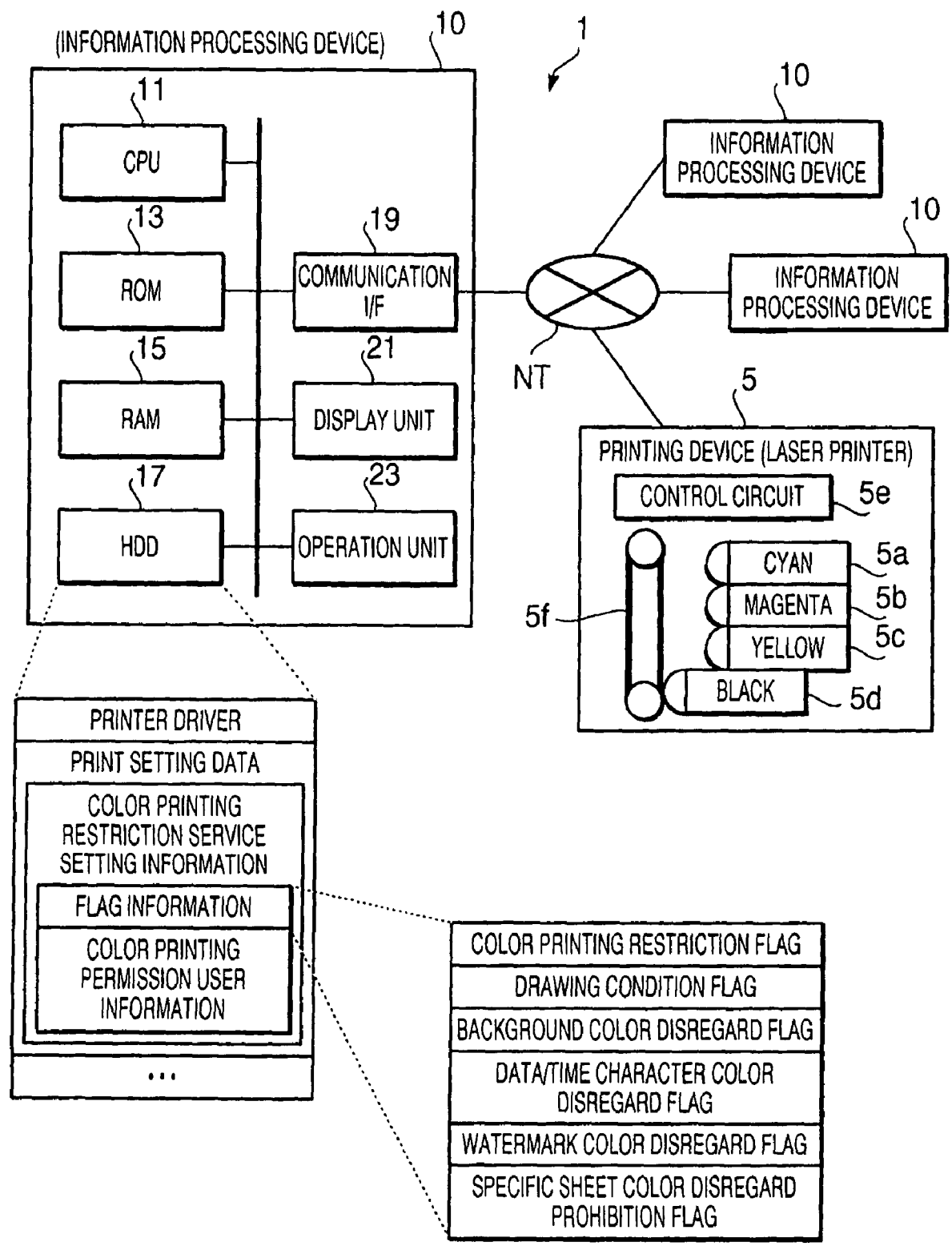
FIG. 1 is a block diagram showing the configuration of a printing system in accordance with an embodiment of the present invention.

As is commonly known, an image to be printed on a sheet by a printing device generally includes not only a main image (the true object for the user performing a print operation) but also attached images which are attached to the main image, such as images for decorating the main image, images representing attribute information on the main image, images representing supplementary information regarding the main image, etc. Specifically, the attached images can include a background image, a watermark, and images printed in the header area and the footer area of the sheet (representing the print date/time of the main image, etc.), for example.

The print target data can be classified into three types: print target data in which both the main data (representing the main image) and the attached data (representing the attached images) are color data, print target data in which either the main data or the attached data is color data, and print target data in which both the main data and the attached data are monochrome data. When the print target data is of the first type (both the main data and the attached data are color data) or the second type (either the main data or the attached data is color data), the aforementioned conventional print control devices instruct the printing device to execute the printing of the print target data by the color printing on condition that the user has the color printing authority.

However, when the main data is monochrome data and the attached data is color data, the result of printing of the main image does not change at all in many cases even when the whole print target data is printed by the printing device not by the color printing but by the monochrome printing. The conventional print control devices instruct the printing device to print the print target data necessarily by the color printing in cases where either the main data or the attached data is color data even though the value of the printed matter is not deteriorated much by the employment of the monochrome printing instead of the color printing, by which the conventional print control devices are necessitated to have certain limitations on the reduction of the running cost.

Further, since the color printing generally takes more time to form the print image on the sheet compared to the monochrome printing, some conventional print control devices, that are configured to instruct the printing device to execute the printing of print target data including monochrome main data by means of the color printing, cause wastefully long processing time of the printing device.

To resolve the above problem, the print control device in accordance with the present invention determines whether to make the printing device execute the color printing or to make the printing device execute the monochrome printing for the printing of the image corresponding to the print target data, based not on data (included in the data group forming the print target data) corresponding to the attached data but on data corresponding to the main data.

By the print control device in accordance with the present invention, the printing device can be controlled to properly execute the printing of the print target data while restricting the execution of the color printing since the switching of the printing method between the color printing and the monochrome printing has substantially no ill effect on the printed image corresponding to the main data. Since the value of the printed matter is hardly deteriorated by the switching from the color printing to the monochrome printing (in the case where the main data is monochrome data), the user dissatisfaction with the quality of the printout can substantially be avoided and the possibility of causing disadvantages (due to the color printing restriction) to the user during work/business using the printed matter can be reduced, while successfully achieving the reduction of the running cost of the printing device.

As above, the print control device in accordance with the present invention is capable of desirably making the printing device execute the printing of the print target data by properly switching the printing method between the color printing and the monochrome printing depending on the composition of the print target data while appropriately reducing the frequency of execution of the color printing (with higher running cost and lower printing speed compared to the monochrome printing).

Incidentally, the "attached data" mean data that are attached (subordinate) to the main data as mentioned above. The attached data can include image data for decorating the image represented by the main data, data including information indicating attributes of the main data, etc. The image data for decorating the image represented by the main data can include image data to be laid out as a background image behind the image represented by the main data, image data to be laid out as a frame image around the image represented by the main data, etc. The data including information indicating attributes of the main data can include data representing the print date/time to be printed in the header area or footer area of the sheet, image data of a watermark indicating "FOR COMPANY USE ONLY", etc.

Preferably, the print control device is used for controlling a printing device which is equipped with multiple color materials including black material and which exclusively uses the black material for the monochrome printing while using the multiple color materials for the color printing.

In a printing device of this type, the color printing generally requires a higher printing cost and a longer printing time compared to the monochrome printing in order to express a variety of colors using the multiple color materials. By employing the print control device for a printing device of this type, the running cost of the printing device and the time necessary for the printing can be reduced efficiently by the reduction of the frequency of the color printing. Further, thanks to the reduction of the printing time, the printing device is prevented from holding unprocessed print jobs for a long time.

For the source specifying the print target data (e.g. the user), it is sometimes unnecessary to employ the color printing for the printing of the image corresponding to the main data. Therefore, the above print control device is desired to be configured as below.

Preferably, the color restriction print control unit of the print control device makes the printing device execute the printing of the image corresponding to the print target data on the sheet by the monochrome printing in cases where the print target data is specified as data for the monochrome printing. In cases where the print target data is not specified as data for the monochrome printing, the color restriction print control unit makes the printing device execute the printing of the image corresponding to the print target data by the color printing or by the monochrome printing depending on the judgment by the main data color/monochrome judgment unit.

Specifically, when the print target data is not specified as data for the monochrome printing and the main data is judged to be color data by the main data color/monochrome judgment unit, the color restriction print control unit makes the printing device execute the printing of the image corresponding to the print target data by the color printing. When the print target data is not specified as data for the monochrome printing and the main data is judged not to be color data by the main data color/monochrome judgment unit, the color restriction print control unit makes the printing device execute the printing of the image corresponding to the print target data by the monochrome printing irrespective of whether the attached data is color data or not.

The print control device configured as above is capable of receiving instructions specifying the monochrome printing from outside, by which unnecessary execution of the color printing by the printing device can be prevented. Consequently, the running cost, the printing time, etc. of the printing device can be reduced.

While the above print control device may be configured to be incapable of disabling a "color printing restriction service" (the service implemented by the color restriction print control unit), such a print control device (incapable of disabling the color printing restriction service and constantly executing the color printing restriction service) can involve some disadvantages and inconveniences. To avoid this problem, the print control device may be configured as below.

Preferably, the print control device further comprises a setting unit which sets the color printing restriction service in an enabled state or a disabled state. The color restriction print control unit operates only when the color printing restriction service has been set in the enabled state.

The print control device configured as above is capable of switching the color printing restriction service between the enabled state and the disabled state, by which the aforementioned disadvantages and inconveniences, which can be caused by the forcible (constant) execution of the color printing restriction service, can be eliminated.

The print control device may be configured to make the printing device execute the color printing or the monochrome printing of the print target data according to a generally employed method when the color printing restriction service is in the disabled state. For example, the print control device may be configured as below.

Preferably, the print control device further comprises an unconditional print control unit which operates instead of the color restriction print control unit when the color printing restriction service has been set in the disabled state and makes the printing device execute the printing of the image corresponding to the print target data on the sheet when the print target data is specified from outside. The unconditional print control unit makes the printing device execute the printing of the image corresponding to the print target data on the sheet by the monochrome printing in cases where the print target data is specified as data for the monochrome printing, while making the printing device execute the printing by the color printing in cases where the print target data is not specified as data for the monochrome printing.

The print control device configured as above is capable of properly making the printing device execute the color printing or the monochrome printing of the print target data while leaving out the color printing restriction service as needed, by which the aforementioned disadvantages and inconveniences (which can be caused by the forcible execution of the color printing restriction service) can be eliminated. In the disabled state of the color printing restriction service, the unconditional print control unit (operating instead of the color restriction print control unit) makes the printing device execute the printing of the print target data by the monochrome printing in cases where the print target data is specified as data for the monochrome printing, otherwise the unconditional print control unit makes the printing device execute the printing by the color printing. Incidentally, the "cases where the print target data is specified as data for the monochrome printing" include cases where data that is not color data is specified as the print target data, cases where a "monochrome printing mode" is selected as the printing mode when the print target data is specified, etc.

Preferably, the setting unit is configured to set the color printing restriction service in the enabled state when a signal requesting the enabling of the color printing restriction service is inputted via a user interface while setting the color printing restriction service in the disabled state when a signal requesting the disabling of the color printing restriction service is inputted via the user interface.

The print control device comprising the setting unit configured as above is capable of switching the enabling/disabling of the color printing restriction service according to instructions from the user, by which the disadvantages and inconveniences (which can be caused by the forcible execution of the color printing restriction service) can be eliminated when the color printing restriction is disadvantageous to the user.

Incidentally, it is more preferable to configure the print control device to switch the enabling/disabling of the color printing restriction service according to instructions from a particular user, such as the administrator of the print control device. By configuring the print control device as above so that only the administrator can switch the enabling/disabling of the color printing restriction service, it becomes possible to control the running cost of the printing device (by the switching of the enabling/disabling of the color printing restriction service) from the administrator side.

The setting unit may be configured to be capable of setting the color printing restriction service in the enabled state or the disabled state depending on an attribute of a user specifying the print target data.

The print control device comprising the setting unit configured as above is capable of switching the enabling/disabling of the color printing restriction service depending on the user. Therefore, in cases where the print control device is used in an office, for example, the color printing restriction service can be disabled for users for whom the color printing restriction service causes disadvantages in work or business, by which the disadvantages can be eliminated.

The setting unit may also be configured to be capable of setting the color printing restriction service in the enabled state or the disabled state depending on the type of the sheet on which the print target data is printed.

The print control device comprising the setting unit configured as above is capable of switching the enabling/disabling of the color printing restriction service depending on the type of the sheet. Therefore, disadvantages that can be caused by the execution of the color printing restriction service can be eliminated in printing of data on a postcard or glossy paper, for example. In the case where a postcard or glossy paper is specified as the sheet, the possibility that the user needs the color printing is high and the restriction on the color printing is highly likely to cause user dissatisfaction. Such a problem can be eliminated by configuring the setting unit as above.

As mentioned above, the attached data can include data to be printed in the header area or footer area of the sheet (e.g. data representing the print date/time), image data of a watermark, etc. Although data of this kind are specified from outside as the attached data of the main data, data such as the background image data (as image data for decorating the image represented by the main data) are generally not specified from outside as the attached data.

Therefore, in order to configure the print control device to be able to handle suitable data satisfying a prescribed condition as the attached data even when the data has not been specified as the attached data, the print control device may be equipped with a classifying unit as described below.

Preferably, the print control device further comprises a classifying unit which classifies records forming the print target data, each of which represents a partial image of a print image represented by the print target data, into the main data and the attached data based on layout of the print image when the print target data is specified from outside. The main data color/monochrome judgment unit is configured to judge whether the records forming the print target data and being classified as the main data by the classifying unit are color data or not.

The print control device configured as above is capable of classifying each record forming the print target data as the main data or the attached data based on the layout of the print image according to a prescribed condition. Therefore, the print control device is capable of implementing the color printing restriction service while handling records representing the background image as the attached data, for example.

Preferably, the color printing restriction service is configured to be capable of letting a prescribed user make settings on whether or not to disregard color of each type of attached image. The color restriction print control unit makes the printing device execute the printing of the image corresponding to the print target data while incorporating the settings made by the prescribed user.

Embodiment

Referring now to the accompanying drawings, a description will be given in detail of a preferred embodiment in accordance with the present invention.

FIG. 1 is a block diagram showing the configuration of a printing system 1 in accordance with an embodiment of the present invention.

The printing system 1 of this embodiment includes a printing device 5 and a plurality of information processing devices 10 which are connected to a network NT. The printing device 5 in the printing system 1 is configured like a well-known network printer. When print data is received from an information processing device 10 via the network NT, the printing device 5 prints an image corresponding to the print data on paper, transparent sheet, etc. (hereinafter simply referred to as a "sheet").

Specifically, the printing device 5 in this embodiment is configured as a color laser printer which executes printing by a four-cycle printing method. The printing device 5 includes a control circuit 5e (having a communication interface) which executes centralized control of the components of the printing device 5, by which color printing or monochrome printing is executed properly for print data received via the network NT.

The printing device 5 includes a development unit 5a containing cyan toner, a development unit 5b containing magenta toner, a development unit 5c containing yellow toner and a development unit 5d containing black toner. The printing device 5 is capable of forming a color image on a sheet by use of the development units 5a-5d.

For the color printing, the printing device 5 carries out the following image formation process for each of the four colors (cyan, magenta, yellow, black). In an image formation process for a color, an electrostatic latent image is formed on a photosensitive belt 5f. The electrostatic latent image is developed by a development unit 5a-5d corresponding to the color, by which a toner image of the color is formed on the photosensitive belt 5f. The toner image on the photosensitive belt 5f is thereafter transferred to an intermediate transfer belt (unshown). Such an image formation process is repeated four times for the four colors (cyan, magenta, yellow, black), by which a color toner image (superposition of the toner images of the four colors) is formed on the surface of the intermediate transfer belt.

The intermediate transfer belt, holding the color toner image formed as above, is pressed against a sheet being fed by a transfer roller (unshown), by which a color image is formed on the surface of the sheet.

On the other hand, for the monochrome printing, the printing device 5 carries out the image formation process for black only, by exclusively using the black development unit 5d. In the image formation process for the monochrome printing, a monochrome toner image (made of the black toner) is formed on the intermediate transfer belt. The intermediate transfer belt holding the monochrome toner image is pressed against a sheet being fed by the transfer roller, by which a monochrome (black and white) image is formed on the surface of the sheet.

Since the printing device 5 in this embodiment is configured as above, the processing speed for the monochrome printing is faster than that for the color printing and the cost for the monochrome printing is lower than that for the color printing.

Meanwhile, each information processing device 10 (connected to the printing device 5 via the network NT to communicate with the printing device 5) has a hardware configuration similar to that of a well-known personal computer. As shown in FIG. 1, the information processing device 10 includes a CPU (Central Processing Unit) 11 for performing various computations, a ROM (Read Only Memory) 13 storing a boot program, etc., a RAM (Random Access Memory) 15 to be used as work areas during program execution by the CPU 11, an HDD (Hard Disk Drive) 17 storing various programs to be executed by the CPU 11, user data, etc., a communication interface 19 capable of bidirectional communication with each device on the network NT, a display unit 21 (LCD, etc.) for displaying information, and an operation unit 23 (keyboard, pointing device, etc.) for receiving user operations.

In this embodiment, each information processing device 10 has the function of making the printing device 5 print out images according to user data which have been created by the user by use of a variety of application software (word processing software, document preparation software, spreadsheet software, etc.). This function is implemented by the CPU 11 by executing a printer driver which has been stored in the HDD 17.

Figure 2:
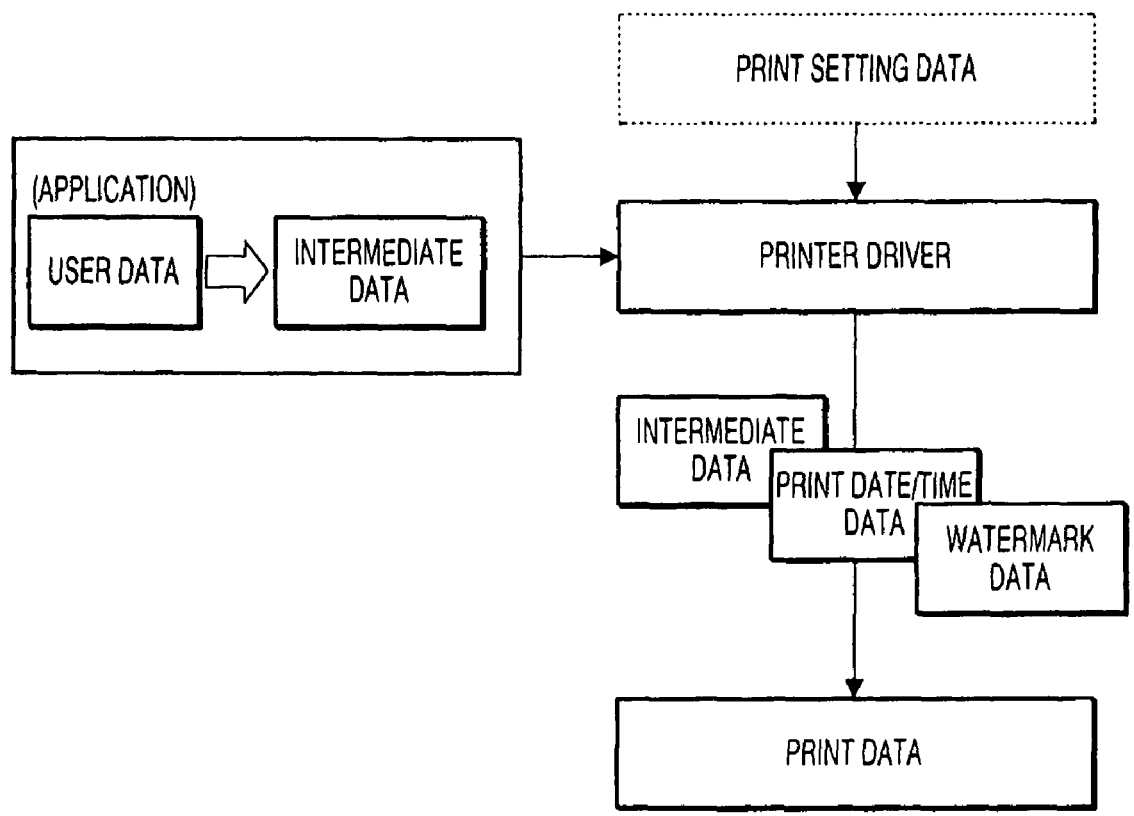
FIG. 2 is a block diagram schematically showing a procedure for converting intermediate data into print data which can be processed by a printing device included in the printing system of FIG. 1.

FIG. 2 is a block diagram schematically showing a procedure for converting the user data into print data which can be processed by the printing device 5. In this embodiment, if a print operation is performed by a user of an information processing device 10 (by performing an operation on a display screen of certain application software being displayed on the display unit 21) when a piece of user data has already been opened by the application software, the opened user data is converted into intermediate data (which can be interpreted by the printer driver) as shown in FIG. 2 by the cooperation of the application software and the operation system of the information processing device 10.

In the information processing device 10, the printer driver converts the intermediate data (generated by the application software as above) into print data (satisfying print conditions specified by print setting data stored in the HDD 17) according to the print setting data. Incidentally, the print data can be data that describes image information on the print target in a page description language (PDL), raster image data, etc.

As shown in FIG. 1, each information processing device 10 in this embodiment stores the print setting data (representing the print conditions, etc.) in its HDD 17. The print setting data is edited by the CPU 11 of the information processing device 10 according to instructions by the user.

Specifically, when an operation for starting a print setting process is performed by the user through the operation unit 23, the CPU 11 of the information processing device 10 executes a program stored in the HDD 17 and thereby displays a print setting dialog (see FIG. 3A) on the display unit 21. FIG. 3A is a screen image showing the composition of the print setting dialog displayed on the display unit 21. According to user operations performed on the print setting dialog, the CPU 11 edits the print setting data and changes the print conditions, etc.

As shown in FIG. 3A, the print setting dialog in this embodiment is made up of a plurality of tab sheets. When a tab in the print setting dialog is clicked on by the user, a tab sheet corresponding to the clicked tab is set active and displayed at the front of the print setting dialog. In this embodiment, a "basic setting" tab sheet is assumed to be automatically set active in the initial display state of the print setting dialog.

The "basic setting" tab sheet of the print setting dialog (see FIG. 3A) includes a plurality of input objects P11-P16 (pull-down menus P11, P12, P14 and P15, radio buttons P13 and a check box 16) capable of receiving user operations for setting the sheet size, page layout, orientation (direction of the sheet), the number of copies, sheet type and whether the monochrome printing is necessary or not. According to the user operations performed on the "basic setting" tab sheet, the CPU 11 of the information processing device 10 edits the print setting data, by which the values of parameters described in the print setting data to represent the print conditions such as the size of the sheet to be printed on, the page layout, the orientation (sheet direction), the number of copies, the sheet type and whether the monochrome printing is necessary or not (i.e. print condition parameters) are changed and updated.

FIG. 3B is a screen image showing the composition of a "detailed setting" tab sheet which is included in the print setting dialog. In this embodiment, when a "detailed setting" tab is clicked on by the user, the "detailed setting" tab sheet is set active and displayed at the front of the print setting dialog.

As shown in FIG. 3B, the "detailed setting" tab sheet includes a plurality of input objects P21-P29 (pull-down menus P27, P28 and P29, buttons P23, P24 and P25, check boxes P21 and P26, etc.) capable of receiving user operations for setting whether printing of a watermark is necessary or not, selecting a watermark to be printed, adding/editing/deleting a watermark, setting whether printing of the date and time (print date/time) is necessary or not, selecting the position of the date/time printing, selecting a font to be used for the date/time printing, and selecting the color of characters to be used for the date/time printing.

The CPU 11 of the information processing device 10 edits the print setting data according to the user operations performed on the "detailed setting" tab sheet, by which values of parameters described in the print setting data to represent the print conditions such as whether the watermark printing is necessary or not, an identification code of a print target watermark (watermark to be printed), whether the date/time printing is necessary or not, the position of the date/time printing, the font for the date/time printing and the character color for the date/time printing (i.e. print condition parameters) are changed and updated.

To sum up, for the generation of the print data, each information processing device 10 in this embodiment refers to the print condition parameters specified by the print setting data, and generates print data satisfying the print condition parameters based on each of the print condition parameters.

For example, when a print condition parameter indicating whether the watermark printing is necessary or not has been set at a value meaning "necessary", the CPU 11 acquires image data of the print target watermark from the HDD 17 based on the value of the parameter representing the identification code of the print target watermark, and generates the print data (in which the watermark as a semi-transparent image is laid out on an image corresponding to the intermediate data acquired from the application software) based on the image data of the print target watermark (hereinafter also referred to as "watermark data").

When a print condition parameter indicating whether the date/time printing is necessary or not has been set at a value meaning "necessary", the CPU 11 adds print date/time data (image data representing the print date/time (current date/time)) to the print data. Specifically, the CPU 11 obtains the (resultant) print data by laying out an image representing the current date/time (in the font and character color specified by print condition parameters representing the font and the character color of the date/time) at a printing position specified by a print condition parameter representing the position of the date/time printing, with respect to the layout position of the image corresponding to the intermediate data.

The print data generated as above is transmitted from the information processing device 10 to the printing device 5 via the network NT together with a color printing instruction or a monochrome printing instruction. Upon reception of the print data and the color/monochrome printing instruction, the printing device 5 prints an image corresponding to the print data on the sheet by executing the color printing or the monochrome printing according to the printing instruction.

Incidentally, the printer driver installed in each information processing device 10 in this embodiment includes a program for implementing a "color printing restriction service". The "color printing restriction service" means a service for partially restricting the color printing. User operations for enabling/disabling the color printing restriction service, etc. are received by a color printing restriction service setting dialog (see FIG. 3C). FIG. 3C is a screen image showing the composition of the color printing restriction service setting dialog.

The color printing restriction service setting dialog is displayed on the display unit 21 (independently of the print setting dialog) when a "color printing restriction" button P17 on the print setting dialog shown in FIG. 3A is pressed. The color printing restriction service setting dialog includes an input object (check box) P31 for receiving a user operation (through the operation unit 23) for selecting (switching) the enabling/disabling of the color printing restriction service.

The color printing restriction service setting dialog further includes an input object (check box) P32 for receiving a user operation for selecting (switching) whether to set drawing conditions or not when the color printing restriction service has been enabled. When the setting of the drawing conditions has been specified by the user through the input object P32, the CPU 11 makes a restriction on the color printing based on the drawing conditions which have been set by the user through the subsequent input objects P33-P36. On the other hand, when the setting of the drawing conditions has not been specified by the user, the CPU 11 instructs the printing device 5 to print an image according to the print target data (specified by the user) by means of the monochrome printing except when the user is permitted the color printing in step S330 which will be explained later.

The color printing restriction service setting dialog further includes an input object (check box) P33 for receiving a user operation for selecting (switching) whether or not to disregard the background color (as one of the drawing conditions), an input object (check box) P34 for receiving a user operation for selecting (switching) whether or not to disregard the character color of the print date/time (as one of the drawing conditions), an input object (check box) P35 for receiving a user operation for selecting (switching) whether or not to disregard the color of the watermark (as one of the drawing conditions), and an input object (check box) P36 for receiving a user operation for selecting (switching) whether or not to cancel (prohibit) the disregard of color when a specific type of sheet is used (as one of the drawing conditions).

In this embodiment, the settings which have been made on the color printing restriction service setting dialog are described in the print setting data (which is stored in the HDD 17) by the CPU 11, as setting information regarding the color printing restriction service.

Figure 4:
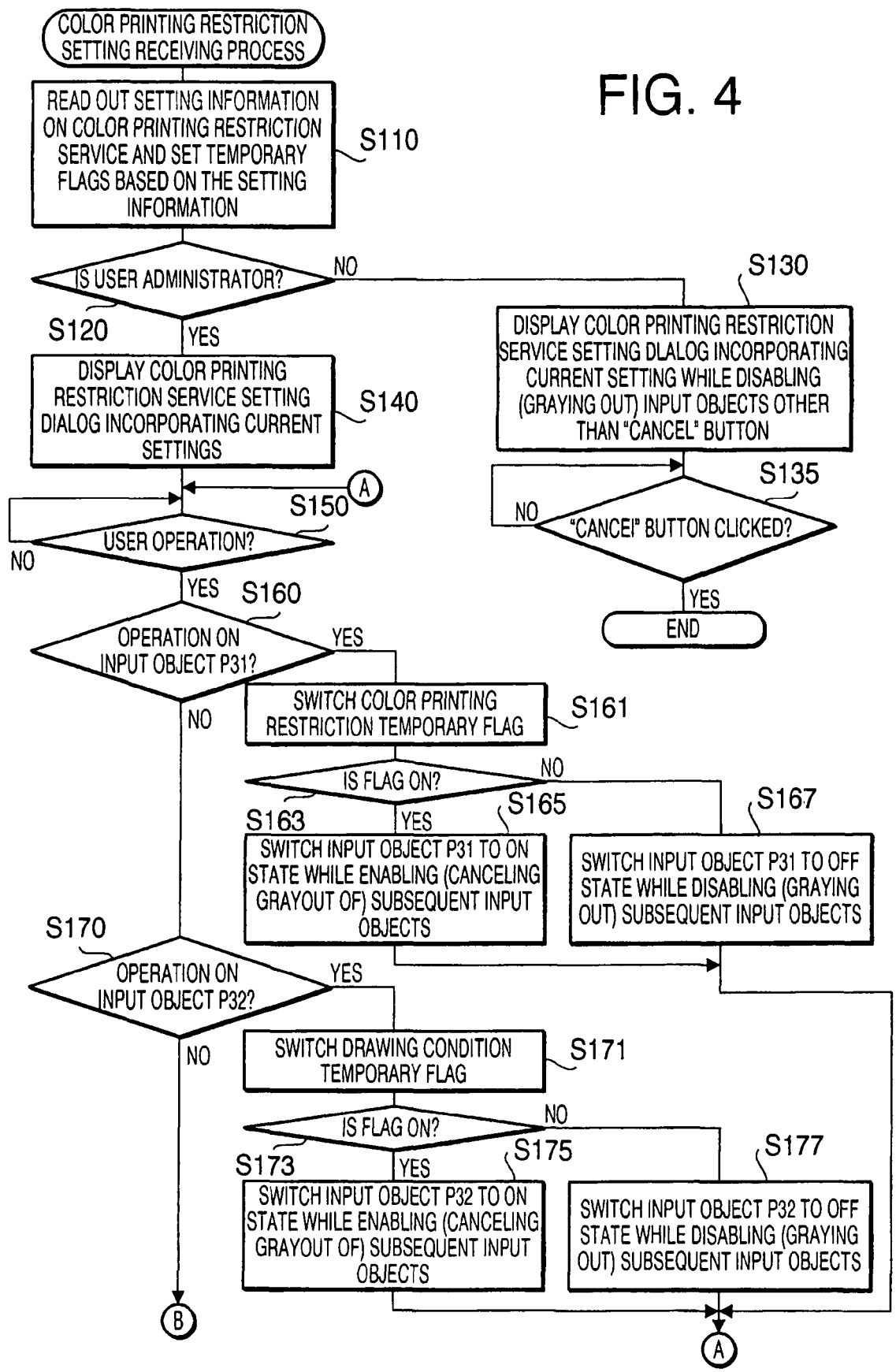
FIGS. 4 and 5 are flow charts showing a color printing restriction setting receiving process which is executed by the CPU of the information processing device.
Figure 5:
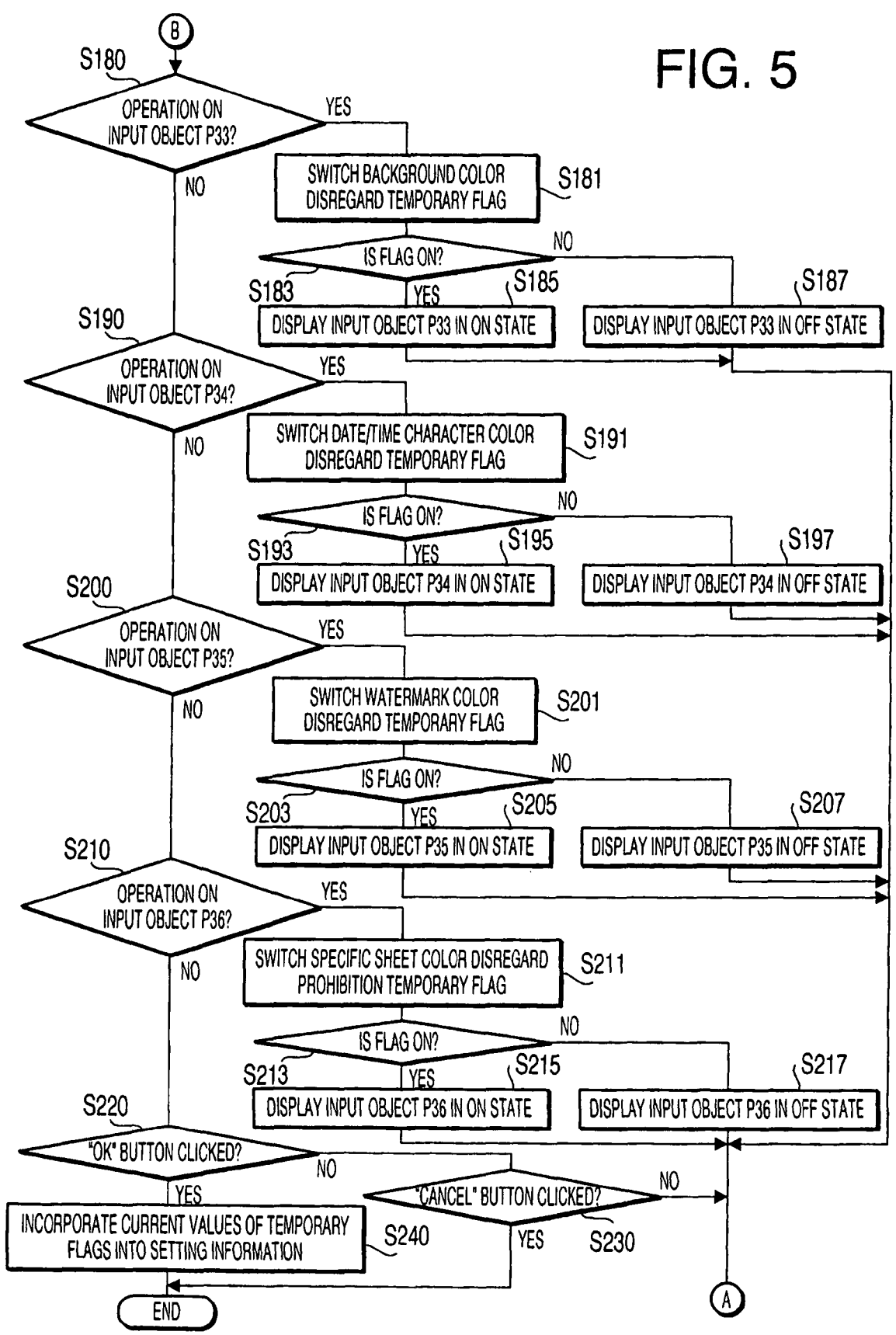

FIGS. 4 and 5 are flow charts showing a color printing restriction setting receiving process which is executed by the CPU 11 of the information processing device 10 (for receiving setting operations regarding the color printing restriction service) when the "color printing restriction" button P17 on the print setting dialog (see FIG. 3A) is clicked by use user. In the following, the color printing restriction setting receiving process will be explained in detail.

The CPU 11 starts the color printing restriction setting receiving process in response to the clicking of the "color printing restriction" button P17 on the print setting dialog. At the start of the process, the CPU 11 reads out the setting information regarding the color printing restriction service from the print setting data stored in the HDD 17, and sets a "color printing restriction temporary flag" (as a parameter created at the start of the color printing restriction setting receiving process) at the value of a color printing restriction flag specified by the setting information.

Similarly, the CPU 11 sets a "drawing condition temporary flag" at the value of a drawing condition flag specified by the setting information, sets a "background color disregard temporary flag" at the value of a background color disregard flag specified by the setting information, sets a "date/time character color disregard temporary flag" at the value of a date/time character color disregard flag specified by the setting information, sets a "watermark color disregard temporary flag" at the value of a watermark color disregard flag specified by the setting information, and sets a "specific sheet color disregard prohibition temporary flag" at the value of a specific sheet color disregard prohibition flag specified by the setting information.

After the initial setting of the temporary flags, the CPU 11 judges whether the user who clicked the "color printing restriction" button P17 (as the trigger for starting the color printing restriction setting receiving process) is an administrator of the information processing device 10 or not (S120). Specifically, this judgment is made by checking whether the user has been authorized as an administrator on the operating system of the information processing device 10 based on the login name of the user who clicked the "color printing restriction" button P17.

When the user who clicked the "color printing restriction" button P17 is not an administrator of the information processing device 10 (S120: NO), the CPU 11 advances to step S130 and displays the color printing restriction service setting dialog (incorporating the current settings of the color printing restriction service) on the display unit 21 while disabling the input objects P31-P37 (except a "cancel" button 38) so as not to receive user operations on the input objects. A well-known method for disabling the input objects P31-P37 is graying them out.

After finishing the step S130 as above, the CPU 11 waits until the "cancel" button 38 on the color printing restriction service setting dialog is clicked by the user (who is not an administrator) through the operation unit 23 (S135). When the "cancel" button 38 is clicked (S135: YES), the CPU 11 closes the color printing restriction service setting dialog displayed on the display unit 21 and ends the color printing restriction setting receiving process.

On the other hand, when the user who clicked the "color printing restriction" button P17 is an administrator of the information processing device 10 (S120: YES), the CPU 11 advances to step S140 and displays the color printing restriction service setting dialog (incorporating the current settings of the color printing restriction service) on the display unit 21. Specifically, input objects (check boxes) P31-P36 corresponding to temporary flags that have currently been set to ON are set in the ON state (checked state) and those corresponding to temporary flags that have currently been set to OFF are set in the OFF states (non-checked state) on the color printing restriction service setting dialog. In the displaying of the dialog, some of the input objects can be displayed in the disabled state (so as to be consistent with a process described later) depending on the current settings.

After finishing the step S140 as above, the CPU 11 waits until a user operation is performed on the color printing restriction service setting dialog through the operation unit 23 (S150). When a user operation is performed (S150: YES), the CPU 11 advances to step S160 and judges whether or not the user operation has been performed on the input object P31 (check box for letting the user select (switch) the enabling/disabling of the color printing restriction service).

When the user operation has been performed on the input object P31 (S160: YES), the CPU 11 advances to step S161, otherwise (S160: NO) the CPU 11 advances to step S170.

In the step S161, the CPU 11 switches the value of the color printing restriction temporary flag. Specifically, the CPU 11 switches the color printing restriction temporary flag into "0" when its current value is "1", while switching the color printing restriction temporary flag into "1" when its current value is "0". In this embodiment, the flag values "0" and "1" mean the OFF state and the ON state of the flag, respectively.

After finishing the step S161, the CPU 11 advances to step S163 and judges whether the color printing restriction temporary flag after the switching in S161 is currently ON or not. When the color printing restriction temporary flag is currently ON (S163: YES), the CPU 11 displays the input object P31 (check box for letting the user select (switch) the enabling/disabling of the color printing restriction service) in the ON state (checked state) (S165).

Since subsequent input objects P32-P36 have been disabled (grayed out) when the input object P31 is in the OFF state (non-checked state) on the color printing restriction service setting dialog, the CPU 11 in the step S165 cancels the disabling (grayout) of the subsequent input objects P32-P36 while switching the input object P31 to the ON state (checked state) as above. Thereafter, the process returns to the step S150.

When the color printing restriction temporary flag is currently OFF in S163 (S163: NO), the CPU 11 displays the input object P31 in the OFF state while disabling (graying out) the subsequent input objects P32-P36 (S167). Thereafter, the process returns to the step S150.

In the step S170, the CPU 11 judges whether or not the user operation has been performed on the input object P32 (check box for letting the user select (switch) whether to set the drawing conditions or not). When the user operation has been performed on the input object P32 (S170: YES), the CPU 11 advances to step S171, otherwise (S170: NO) the CPU 11 advances to step S180.

In the step S171, the CPU 11 switches the value of the drawing condition temporary flag similarly to the method of S161. Subsequently, the CPU 11 advances to step S173 and judges whether the drawing condition temporary flag after the switching in S171 is currently ON or not. When the drawing condition temporary flag is currently ON (S173: YES), the CPU 11 displays the input object P32 in the ON state (S175). Since subsequent input objects P33-P36 have been disabled (grayed out) when the input object P32 is in the OFF state on the color printing restriction service setting dialog, the CPU 11 in the step S175 cancels the disabling (grayout) of the subsequent input objects P33-P36. Thereafter, the process returns to the step S150.

When the drawing condition temporary flag is currently OFF in S173 (S173: NO), the CPU 11 displays the input object P32 in the OFF state while disabling (graying out) the subsequent input objects P33-P36 (S177). Thereafter, the process returns to the step S150.

In the step S180, the CPU 11 judges whether or not the user operation has been performed on the input object P33 (check box for letting the user select (switch) whether to disregard the background color or not). When the user operation has been performed on the input object P33 (S180: YES), the CPU 11 advances to step S181, otherwise (S180: NO) the CPU 11 advances to step S190.

In the step S181, the CPU 11 switches the value of the background color disregard temporary flag similarly to the method of S161. Subsequently, the CPU 11 advances to step S183 and judges whether the background color disregard temporary flag after the switching in S181 is currently ON or not. When the background color disregard temporary flag is currently ON (S183: YES), the CPU 11 displays the input object P33 in the ON state (S185). Thereafter, the process returns to the step S150.

When the background color disregard temporary flag is currently OFF in S183 (S183: NO), the CPU 11 displays the input object P33 in the OFF state (S187). Thereafter, the process returns to the step S150.

In the step S190, the CPU 11 judges whether or not the user operation has been performed on the input object P34 (check box for letting the user select (switch) whether to disregard the character color of the print date/time or not). When the user operation has been performed on the input object P34 (S190: YES), the CPU 11 advances to step S191, otherwise (S190: NO) the CPU 11 advances to step S200.

In the step S191, the CPU 11 switches the value of the date/time character color disregard temporary flag similarly to the method of S161. Subsequently, the CPU 11 advances to step S193 and judges whether the date/time character color disregard temporary flag after the switching in S191 is currently ON or not. When the date/time character color disregard temporary flag is currently ON (S193: YES), the CPU 11 displays the input object P34 in the ON state (S195). Thereafter, the process returns to the step S150.

When the date/time character color disregard temporary flag is currently OFF in S193 (S193: NO), the CPU 11 displays the input object P34 in the OFF state (S197). Thereafter, the process returns to the step S150.

In the step S200, the CPU 11 judges whether or not the user operation has been performed on the input object P35 (check box for letting the user select (switch) whether to disregard the color of the watermark or not). When the user operation has been performed on the input object P35 (S200: YES), the CPU 11 advances to step S201, otherwise (S200: NO) the CPU 11 advances to step S210.

In the step S201, the CPU 11 switches the value of the watermark color disregard temporary flag similarly to the method of S161. Subsequently, the CPU 11 advances to step S203 and judges whether the watermark color disregard temporary flag after the switching in S201 is currently ON or not.

When the watermark color disregard temporary flag is currently ON (S203: YES), the CPU 11 displays the input object P35 in the ON state (S205). Thereafter, the process returns to the step S150.

When the watermark color disregard temporary flag is currently OFF in S203 (S203: NO), the CPU 11 displays the input object P35 in the OFF state (S207). Thereafter, the process returns to the step S150.

In the step S210, the CPU 11 judges whether or not the user operation has been performed on the input object P36 (check box for letting the user select (switch) whether or not to cancel (prohibit) the disregard of color when a specific type of sheet such as photo paper is used). When the user operation has been performed on the input object P36 (S210: YES), the CPU 11 advances to step S211, otherwise (S210: NO) the CPU 11 advances to step S220.

In the step S211, the CPU 11 switches the value of the specific sheet color disregard prohibition temporary flag similarly to the method of S161. Subsequently, the CPU 11 advances to step S213 and judges whether the specific sheet color disregard prohibition temporary flag after the switching in S211 is currently ON or not. When the specific sheet color disregard prohibition temporary flag is currently ON (S213: YES), the CPU 11 displays the input object P36 in the ON state (S215). Thereafter, the process returns to the step S150.

When the specific sheet color disregard prohibition temporary flag is currently OFF in S213 (S213: NO), the CPU 11 displays the input object P36 in the OFF state (S217). Thereafter, the process returns to the step S150.

In the step S220, the CPU 11 judges whether or not the user operation has been performed on the "OK" button P37. When the user operation has been performed on the "OK" button P37 (S220: YES), the CPU 11 incorporates the current values of the temporary flags into the print setting data stored in the HDD 17 (S240).

Specifically, the values of the color printing restriction flag, the drawing condition flag, the background color disregard flag, the date/time character color disregard flag, the watermark color disregard flag and the specific sheet color disregard prohibition flag (specified by the print setting data stored in the HDD 17) are updated to the current values of the color printing restriction temporary flag, the drawing condition temporary flag, the background color disregard temporary flag, the date/time character color disregard temporary flag, the watermark color disregard temporary flag and the specific sheet color disregard prohibition temporary flag, respectively.

After finishing the step S240 as above, the CPU 11 closes the color printing restriction service setting dialog and ends the color printing restriction setting receiving process.

Meanwhile, when the user operation has been performed not on the "OK" button P37 in S220 (S220: NO), the CPU 11 judges whether or not the user operation has been performed on the "cancel" button P38 (S230). When the user operation has been performed on the "cancel" button P38 (S230: YES), the CPU 11 discards the current values of the temporary flags, closes the color printing restriction service setting dialog and ends the color printing restriction setting receiving process.

On the other hand, when the user operation has been performed not on the "cancel" button P38 (S230: NO), the CPU 11 returns to the step S150 and repeats the process of S150-S230 until the "OK" button P37 or the "cancel" button P38 is clicked eventually by the user.

Figure 6:
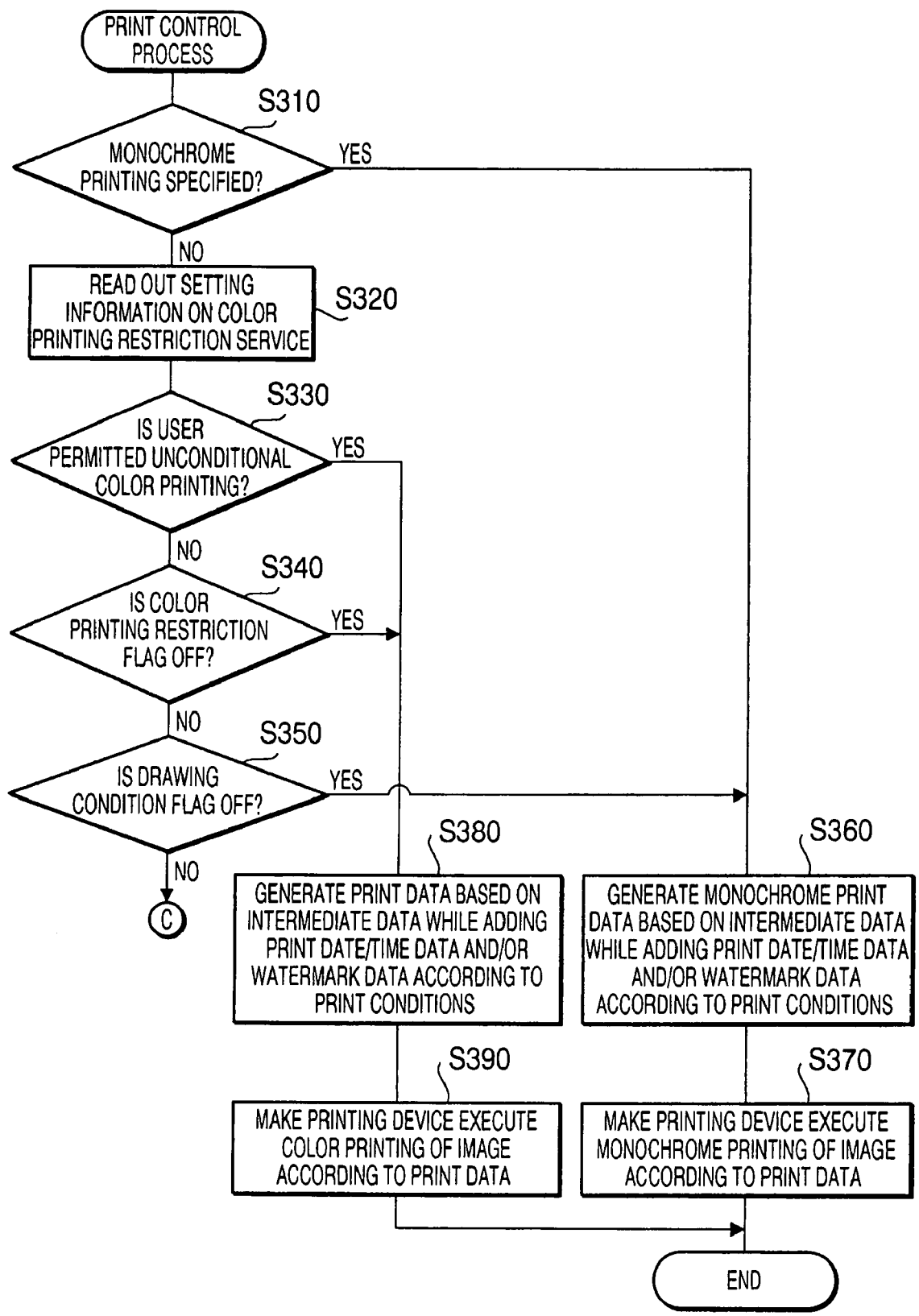
FIGS. 6 and 7 are flow charts showing a print control process which is executed by the CPU of the information processing device.
Figure 7:
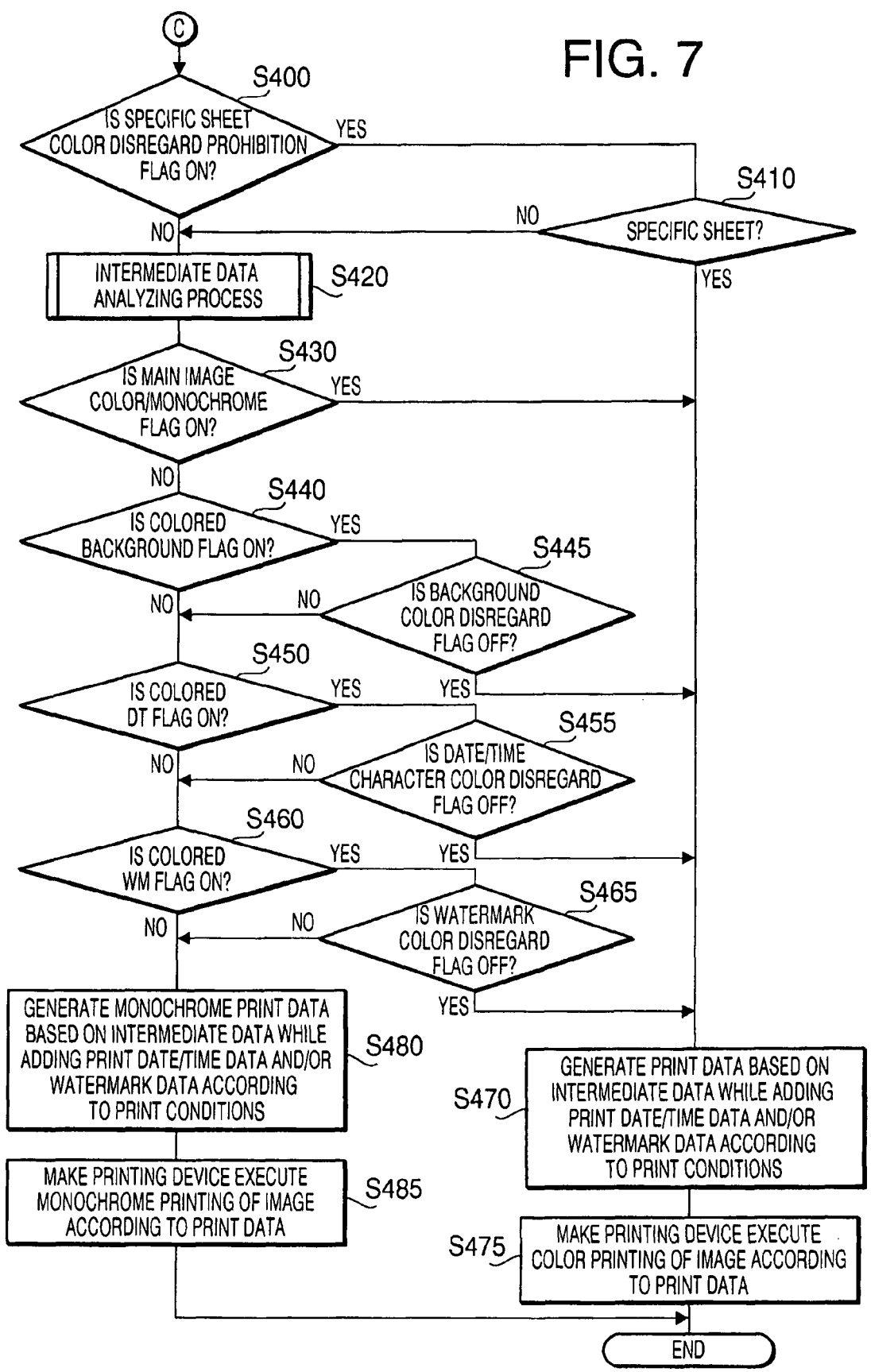

Next, a print control process which is executed by the CPU 11 of the information processing device 10 will be explained. FIGS. 6 and 7 are flow charts showing the print control process. The print control process is executed by the CPU 11 according to the printer driver when intermediate data regarding the print target user data is supplied from certain application software when the print operation is performed by a user on a display screen of the application software.

At the start of the print control process, the CPU 11 judges whether or not the monochrome printing has been specified for the print target user data through the input object P16 on the print setting dialog (S310). When the monochrome printing has been specified (S310: YES), the CPU 11 converts the intermediate data corresponding to the print target user data into print data of a monochrome image (S360). In this step, print data satisfying the print conditions is generated according to the other print conditions which have been set through the print setting dialog. Here, the above "other print conditions" do not include the print conditions specified by the setting information regarding the color printing restriction service.

For example, when the print condition parameter indicating whether the watermark printing is necessary or not has been set at the value meaning "necessary", the CPU 11 recognizes that a piece of watermark data has been specified for the print target data, and generates the print data in which the watermark as a semi-transparent image is laid out on an image corresponding to the intermediate data acquired from the application software. Incidentally, in cases where the watermark specified through the print setting dialog is a color watermark (watermark of a color image), the CPU 11 converts the watermark data into monochrome image data and incorporates the monochrome image data into the print data.

Similarly, when the print condition parameter indicating whether the date/time printing is necessary or not has been set at the value meaning "necessary", the CPU 11 recognizes that a piece of print date/time data has been specified for the print target data, and adds the print date/time data to the print data. In cases where the character color of the print date/time specified through the print setting dialog is color (i.e. other than black and white), the CPU 11 converts the print date/time data (image data representing the print date/time) into monochrome (black and white) image data and incorporates the monochrome image data into the print data (S360).

After finishing the step S360 as above, the CPU 11 transmits the print data generated in S360 to the printing device 5 together with a monochrome printing instruction signal so as to make the printing device 5 execute the monochrome printing of the image according to the print data generated in S360 (S370). Thereafter, the print control process is ended.

On the other hand, when the monochrome printing has not been specified for the print target user data in S310 (S310: NO), the CPU 11 advances to step S320 and reads out the setting information regarding the color printing restriction service from the print setting data stored in the HDD 17.

In the next step S330, the CPU 11 judges whether the user who performed the print operation (as the trigger for the execution of the print control process) is one who has previously been permitted "unconditional color printing" or not based on color printing permission user information which is included in the setting information regarding the color printing restriction service (which has been read out in S320). Incidentally, the color printing permission user information includes a list of login names of users who have been permitted the unconditional color printing. The color printing permission user information is edited by the administrator(s) of the information processing device 10.

The judgment of S330 (whether the user who performed the print operation has previously been permitted the unconditional color printing or not) is made by checking whether the login name of the user who performed the print operation is included in the color printing permission user information or not. Incidentally, the execution authority to edit the color printing permission user information is managed by the operating system of the information processing device 10, and thus the color printing permission user information can not be edited by users other than the administrator(s) of the information processing device 10.

When the user who performed the print operation has previously been permitted the unconditional color printing (S330: YES), the CPU 11 advances to step S380 and converts the intermediate data corresponding to the print target user data into print data satisfying the print conditions based on the other print conditions which have been set through the print setting dialog. This step S380 is executed similarly to the aforementioned step S360 except that the print data is generated not forcibly as monochrome print data.

Specifically, in the print data generation in S380, the CPU 11 generates print data that correctly incorporates color information on the intermediate data, color information on the watermark and color information on the print date/time, in which the image of the intermediate data is laid out and the image of the watermark and/or the image of the print date/time are/is further laid out as needed. Similarly to S360, the above "other print conditions" do not include the print conditions specified by the setting information regarding the color printing restriction service.

After finishing the step S380 as above, the CPU 11 transmits the print data generated in S380 to the printing device 5 together with a color printing instruction signal so as to make the printing device 5 execute the color printing of the image according to the print data generated in S380 (S390). Incidentally, in cases where the print data generated in S380 is monochrome print data (print data of a monochrome image), the CPU 11 in S390 instructs the printing device 5 to print out the image according to the print data by means of the monochrome printing. Thereafter, the print control process is ended.

On the other hand, when the user who performed the print operation has not been permitted the unconditional color printing (S330: NO), the CPU 11 advances to step S340 and judges whether the color printing restriction flag (specified by the setting information regarding the color printing restriction service which has been read out in S320) is OFF or not.

When the color printing restriction flag is OFF (S340: YES), the CPU 11 advances to the aforementioned step S380 (generates the print data maintaining the color information on the original intermediate data by the aforementioned method) and instructs the printing device 5 to execute the color printing of the image according to the print data (S390). Thereafter, the print control process is ended.

On the other hand, when the color printing restriction flag is ON (S340: NO), the CPU 11 advances to step S350 and judges whether the drawing condition flag (specified by the setting information regarding the color printing restriction service which has been read out in S320) is OFF or not.

When the drawing condition flag is OFF (S350: YES), the CPU 11 advances to the aforementioned step S360 (generates the monochrome print data by the aforementioned method) and instructs the printing device 5 to execute the monochrome printing of the image according to the print data (S370). Thereafter, the print control process is ended.

On the other hand, when the drawing condition flag is ON (S350: NO), the CPU 11 advances to step S400 and judges whether the specific sheet color disregard prohibition flag (specified by the setting information regarding the color printing restriction service which has been read out in S320) is ON or not.

When the specific sheet color disregard prohibition flag is ON (S400: YES), the CPU 11 advances to step S410, otherwise (S400: NO) the CPU 11 advances to step S420.

In the step S410, the CPU 11 judges whether the sheet to be printed on is a prescribed "specific sheet" or not based on the information on sheet size and sheet type which has been set on the print setting dialog. Specifically, sheets in the postcard size and glossy paper have been specified as the "specific sheets" in this embodiment, and thus the CPU 11 in S410 judges whether or not the sheet to be printed on is a postcard-size sheet or glossy paper.

When the sheet to be printed on is a specific sheet (S410: YES), the CPU 11 advances to step S470 and generates the print data similarly to the method of S380. Specifically, in the print data generation in S470, the CPU 11 generates print data that correctly incorporates color information on the intermediate data, color information on the watermark and color information on the print date/time, in which the image of the intermediate data is laid out and the image of the watermark and/or the image of the print date/time are/is further laid out as needed. Subsequently, the CPU 11 instructs the printing device 5 to execute the color printing of the image according to the print data (S475). Incidentally, in cases where the print data generated in S470 is monochrome print data (print data of a monochrome image), the CPU 11 in S475 instructs the printing device 5 to print out the image according to the print data by means of the monochrome printing. Thereafter, the print control process is ended.

Figure 8:
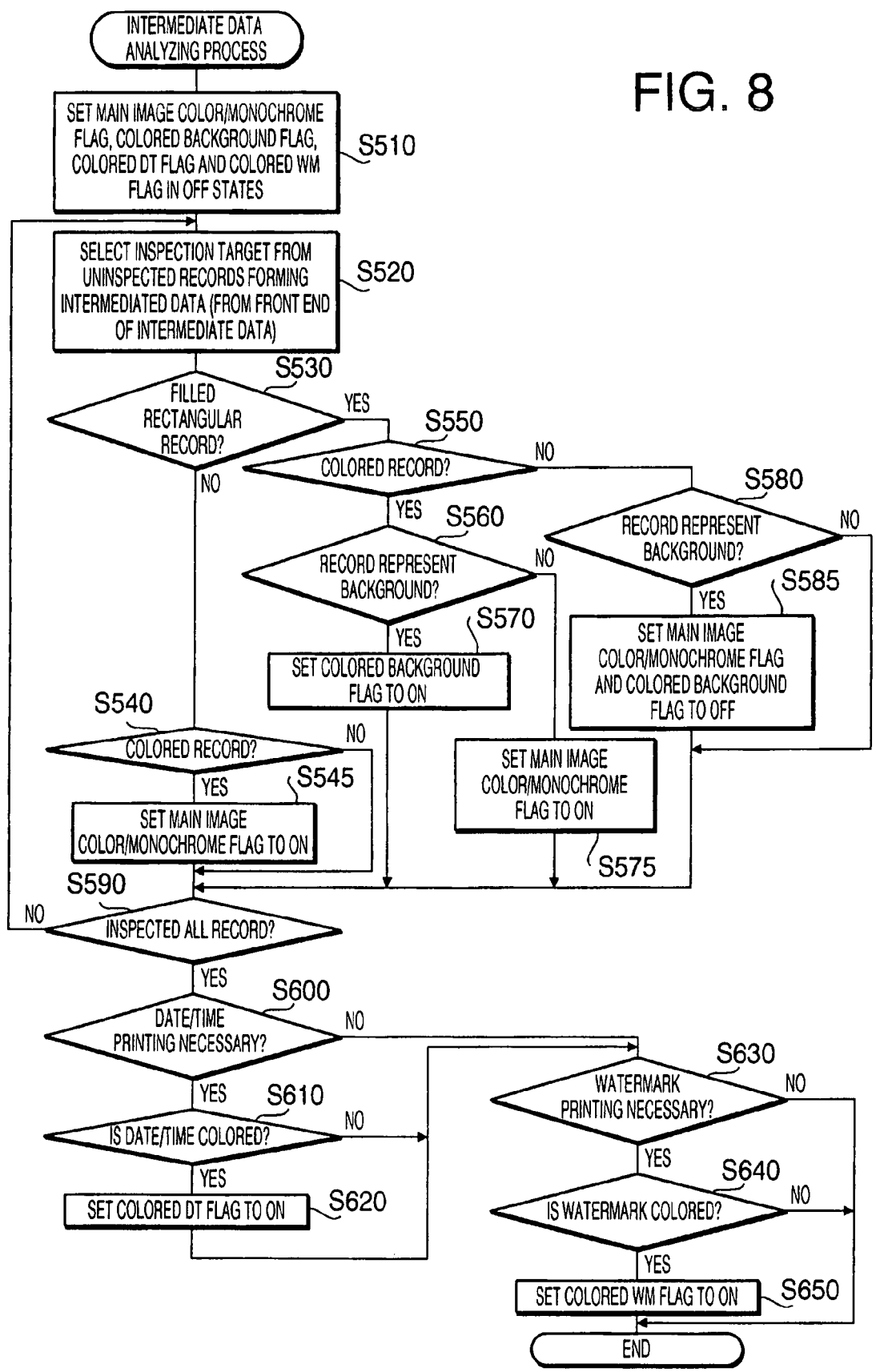
FIG. 8 is a flow chart showing an intermediate data analyzing process which is executed by the CPU of the information processing device.

On the other hand, when the sheet to be printed on is not a specific sheet (S410: NO), the CPU 11 advances to the step S420. In the step S420, the CPU 11 executes an intermediate data analyzing process (see FIG. 8). FIG. 8 is a flow chart showing the intermediate data analyzing process executed by the CPU 11.

At the start of the intermediate data analyzing process, the CPU 11 sets a main image color/monochrome flag, a colored background flag, a colored DT flag and a colored WM flag (as parameters previously created at the start of the print control process) in the OFF state (S510).

In the next step S520, the CPU 11 selects a target of inspection from "records" (forming the intermediate data corresponding to the print target user data) that have not been processed (inspected) in the following process from S530 yet. Specifically, the CPU 11 in S520 selects one of the uninspected records whose position of description in the intermediate data is the foremost, as the target of inspection. In short, the uninspected records are loaded as inspection targets by the CPU 11 successively from the foremost one in S520.

Incidentally, the intermediate data in this embodiment is configured as data that can represent the whole image by use of a group of records representing partial images. Thus, the "record" in this embodiment means data representing a partial image. In the intermediate data description method in this embodiment, the whole image is expressed by successively laying out the partial images (represented by the records) at their drawing positions (which have been specified for the records), in the record description order in the intermediate data. In cases where another partial image has already been laid out at the drawing position, the expression of the whole image is implemented by combining the posterior record (record that is posterior in the description order) with the prior record (record that is prior in the description order).

In the next step S530, the CPU 11 judges whether the record as the inspection target is a filled rectangular record (representing a rectangular image filled in with a color) or not. When the inspection target record is not a filled rectangular record (S530: NO), the CPU 11 advances to step S540 and judges whether the inspection target record is a colored record (having a color other than black and white) or not.

When the inspection target record is a colored record (S540: YES), the CPU 11 sets the main image color/monochrome flag to ON (S545) and thereafter advances to step S590. When the inspection target record is not a colored record (S540: NO), the CPU 11 skips the step S545 and directly advances to the step S590.

When the inspection target record is a filled rectangular record in S530 (S530: YES), the CPU 11 advances to step S550 and judges whether the inspection target record is a colored record or not (i.e., whether the rectangle to be printed is colored or not).

When the inspection target record is a colored record (S550: YES), the CPU 11 judges whether the inspection target record is a record representing a background image or not (S560).

Specifically, the inspection target record is judged to be a record representing a background image in this embodiment if the outer edge of the rectangle represented by the inspection target record is totally contained in a frame-shaped area within 3 cm of the outer edge of the sheet to be printed on and the already-inspected records do not include a record representing a partial image that is laid out at an outer position compared to the rectangle represented by the inspection target record.

When the inspection target record is judged to represent a background image (S560: YES), the CPU 11 sets the colored background flag to ON (S570) and thereafter advances to the step S590. On the other hand, when the inspection target record is judged not to represent a background image (S560: NO), the CPU 11 sets the main image color/monochrome flag to ON (S575) and thereafter advances to the step S590.

When the inspection target record is not a colored record in S550 (S550: NO), the CPU 11 advances to step S580 and judges whether the inspection target record is a record representing a background image or not similarly to the method of S560. When the inspection target record is judged to represent a background image (S580: YES), the CPU 11 sets the main image color/monochrome flag and the colored background flag to OFF (S585) and thereafter advances to the step S590. The main image color/monochrome flag and the colored background flag are set to OFF in this step S585 because an image represented by such a record (judged "YES" in S580) covers all the images represented by the already-inspected records and these images (represented by the already-inspected records) are filled in or covered with the image (i.e., uncolored rectangle) represented by the inspection target record in the printing process (substantially not forming a print image).

On the other hand, when the inspection target record is judged not to represent a background image in S580 (S580: NO), the CPU 11 skips the step S585 and directly advances to the step S590.

In the step S590, the CPU 11 judges whether the above inspection has been finished for all the records forming the intermediate data or not. Specifically, the CPU 11 successively selects each of the records forming the intermediate data as an inspection target and checks whether the process from S530 has already been executed for the selected record. When the inspection has not been finished for all the records yet (S590: NO), the CPU 11 returns to the step S520 and specifies another uninspected record as the inspection target to execute the process from S530 for the inspection target.

On the other hand, when the inspection has been finished for all the records forming the intermediate data (S590: YES), the CPU 11 advances to step S600 and judges whether or not the print condition parameter indicating whether the date/time printing is necessary or not has been set at the value meaning "necessary" through the setting operation on the print setting dialog. When the print condition parameter indicating the necessity of the date/time printing has been set at "necessary" (S600: YES), the CPU 11 advances to step S610, otherwise (S600: NO) the CPU 11 advances to step S630.

In the step S610, the CPU 11 judges whether or not the date/time character color has been set to a color other than black and white through the setting operation on the print setting dialog. When the date/time character color has been set to a color other than black and white (S610: YES), the CPU 11 sets the colored DT flag to ON (S620) and thereafter advances to the step S630. When the date/time character color has not been set to a color other than black and white (S610: NO), the CPU 11 directly advances to the step S630 without setting the colored DT flag to ON.

In the step S630, the CPU 11 judges whether or not the print condition parameter indicating whether the watermark printing is necessary or not has been set at the value meaning "necessary" through the setting operation on the print setting dialog. When the print condition parameter indicating the necessity of the watermark printing has not been set at "necessary" (S630: NO), the CPU 11 ends the intermediate data analyzing process.

On the other hand, when the print condition parameter indicating the necessity of the watermark printing has been set at "necessary" (S630: YES), the CPU 11 judges whether the watermark as a print target is colored data or not (S640). When the print target watermark is colored data (S640: YES), the CPU 11 sets the colored WM flag to ON (S650) and thereafter ends the intermediate data analyzing process. When the print target watermark is not colored data (S640: NO), the CPU 11 ends the intermediate data analyzing process without setting the colored WM flag to ON.

When the intermediate data analyzing process (S420 in FIG. 7) is finished as above, the CPU 11 advances to step S430 and judges whether the main image color/monochrome flag has been set to ON or not. When the main image color/monochrome flag is ON (S430: YES), the CPU 11 generates the print data maintaining the color information on the original data by the aforementioned method of S470 (S470) and instructs the printing device 5 to execute the color printing of the image according to the print data (S475). Thereafter, the print control process is ended.

On the other hand, when the main image color/monochrome flag is OFF (S430: NO), the CPU 11 advances to step S440 and judges whether the colored background flag has been set to ON or not. When the colored background flag is ON (S440: YES), the CPU 11 judges whether the background color disregard flag has been set to OFF or not (S445). When the background color disregard flag is OFF (S445: YES), the CPU 11 generates the print data by the aforementioned method of S470 (S470) and instructs the printing device 5 to execute the color printing of the image according to the print data (S475). Thereafter, the print control process is ended.

When the colored background flag is OFF in S440 (S440: NO) or the background color disregard flag is ON in S445 (S445: NO), the CPU 11 advances to step S450 and judges whether the colored DT flag has been set to ON or not. When the colored DT flag is ON (S450: YES), the CPU 11 judges whether the date/time character color disregard flag has been set to OFF or not (S455). When the date/time character color disregard flag is OFF (S455: YES), the CPU 11 generates the print data by the aforementioned method of S470 (S470) and instructs the printing device 5 to execute the color printing of the image according to the print data (S475). Thereafter, the print control process is ended.

When the colored DT flag is OFF in S450 (S450: NO) or the date/time character color disregard flag is ON in S455 (S455: NO), the CPU 11 advances to step S460 and judges whether the colored WM flag has been set to ON or not.

When the colored WM flag is ON (S460: YES), the CPU 11 judges whether the watermark color disregard flag has been set to OFF or not (S465). When the watermark color disregard flag is OFF (S465: YES), the CPU 11 generates the print data by the aforementioned method of S470 (S470) and instructs the printing device 5 to execute the color printing of the image according to the print data (S475). Thereafter, the print control process is ended.

When the colored WM flag is OFF in S460 (S460: NO) or the watermark color disregard flag is ON in S465 (S465: NO), the CPU 11 advances to step S480 and generates monochrome print data (print data of a monochrome image) similarly to the method of S360. Specifically, in the print data generation in S480, the CPU 11 generates print data in which the monochrome (black and white) image of the intermediate data is laid out and the monochrome image of the watermark and/or the monochrome image of the print date/time are/is further laid out depending on the print conditions. Subsequently, the CPU 11 instructs the printing device 5 to execute the monochrome printing of the image according to the print data (S485). Thereafter, the print control process is ended.

The configuration and operation of the printing system 1 in accordance with this embodiment are as described above.

For example, in a particular case where the color printing restriction flag, the drawing condition flag, the background color disregard flag, the date/time character color disregard flag and the watermark color disregard flag have been set to ON and the sheet to be printed on is not a specific sheet, the information processing device 10 in this embodiment basically (when the monochrome printing has not been specified in S310 (S310: NO) and the user is not permitted the unconditional color printing (S330: NO)) instructs the printing device 5 to execute color printing of the print target image only when the main image (part of the print target image other than the background image, the print date/time character image or the watermark image) is a colored image, while instructing the printing device 5 to execute the monochrome printing of the print target image when the main image is not a colored image irrespective of whether the attached image (e.g., the background image, the print date/time character image or the watermark image) is a color image or not.

In a particular case where the color printing restriction flag, the drawing condition flag, the date/time character color disregard flag and the watermark color disregard flag have been set to ON, the background color disregard flag has been set to OFF and the sheet to be printed on is not a specific sheet, the information processing device 10 handles the background image also as the main image. In this case, the information processing device 10 basically (when the monochrome printing has not been specified in S310 (S310: NO) and the user is not permitted the unconditional color printing (S330: NO)) instructs the printing device 5 to execute color printing of the print target image only when the above "main image" (part of the print target image other than the print date/time character image or the watermark image) is a colored image, while instructing the printing device 5 to execute the monochrome printing of the print target image when the "main image" is not a colored image.

To sum up, in the printing system 1 of this embodiment, the information processing device 10 (CPU 11) judges whether the image specified by the administrator as the "main image" (the image in which color should not be disregarded) is a colored image or not, and determines whether to make the printing device 5 print out the print target image (made up of the "main image" and other attached images) by the color printing or the monochrome printing depending on whether the "main image" is a colored image or not.

As described above, by this embodiment, the frequency of execution of color printing can be reduced without causing any ill effect on the result of printing of the "main image" specified by the administrator. Therefore, the printing method can be properly switched between the color printing and the monochrome printing as needed without deteriorating the value of the printed matter, by which the running cost of the printing device 5 can be reduced without causing any substantial user dissatisfaction with the result of the printing or the quality of the printed matter.

Since the processing speed of the printing device 5 for the monochrome printing is faster than that for the color printing, the printing device 5 is prevented from holding unprocessed print jobs for a long time thanks to the aforementioned reduction of the frequency of execution of the color printing.

In the printing system 1 of this embodiment, a user operation for selecting whether to enable the color printing restriction service or not is received through the color printing restriction service setting dialog and the enabling/disabling of the color printing restriction service is switched according to the user operation on the color printing restriction service setting dialog (according to an instruction by an administrator). Therefore, disadvantages that can be caused by automatic (forcible) execution of the color printing restriction service can be eliminated.

Further, the color printing restriction service is disabled in the printing system 1 of this embodiment when the print operation is performed by a user who has already been registered in the color printing permission user information. Therefore, by registering particular users (for whom the color printing restriction is disadvantageous to their work) in the color printing permission user information, such users performing the print operation are prevented from suffering the work disadvantages that can be caused by the execution of the color printing restriction service.

Furthermore, the color printing restriction service can be disabled in the printing system 1 of this embodiment when the sheet to be printed on is a specific sheet. Therefore, the disadvantages of the execution of the color printing restriction service can be avoided in postcard printing (in which the design is highly important), for example.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, while the present invention is applied to the information processing device 10 which controls the printing device 5 (configured as a laser printer employing the four-cycle printing method) in the above embodiment, the present invention is applicable also to information processing devices controlling printing devices configured differently. For example, the present invention can be applied to an information processing device controlling an ink jet printer using cyan ink, magenta ink, yellow ink and black ink.

While the information processing device 10 (CPU 11) in the above embodiment basically judges each filled rectangle to be the background, the information processing device 10 may also be configured, for example, to check the type of the application software being used and judge raster data extending across a wide area in the sheet to be the background in cases where the application software is presentation document preparation software.

Further, when there exists a special object (record) specifying a background color, the specified color may be judged to be a background color.

While the CPU 11 of the information processing device 10 uses the color printing permission user information (including a list of login names of users who have been permitted the unconditional color printing) for the judgment of S330 (whether the user is permitted the color printing or not) in the above embodiment, the judgment may also be made based on whether the user has been authorized as an administrator on the operating system of the information processing device 10.

While the CPU 11 judges whether the user has been authorized as an administrator on the operating system or not in the judgment step S120 in the above embodiment, the judgment of S120 may also be made by use of the color printing permission user information (including a list of login names of users who have been permitted the unconditional color printing) which is used in the step S330.

While the watermarks are restricted to characters in the above embodiment, images such as bitmap images can also be employed as the watermarks.

The information processing device (print control device) may also be configured to instruct the printing device to constantly execute the monochrome printing for print target data specified by particular users. In this case, it becomes possible to reduce the possibility of causing dissatisfaction in users other than the particular users or the possibility of causing work disadvantages to a lot of employees other than the particular users, while successfully reducing the running cost of the printing device. It is desirable that the "particular users" be selected from users not needing the color printing or rarely needing the color printing.

Incidentally, the print control device (for controlling a printing device as described above) may also be partially incorporated in the printing device.

What is claimed is:

1. A print control device for controlling a printing device, which is configured to switch between color printing and monochrome printing, to cause the printing device to print an image corresponding to print specified target data on a sheet, comprising:
    a main data color/monochrome judgment unit configured to judge whether main data, included in the print target data which includes the main data and attached data, is color data when the print target data is specified;
    a color restriction print control unit configured to cause the printing device to execute color printing of the image corresponding to the print target data on the sheet when the main data color/monochrome judgment unit judges that the main data is color data, the color restriction print control unit causing the printing device to execute monochrome printing irrespective of whether the attached data is color data when the main data color/monochrome judgment unit judges that the main data is not color data; and
    a setting unit which is configured to set a color printing restriction service in an enabled state or a disabled state depending on the type of the sheet on which the print target data is printed, the setting unit setting the color restriction service to the enabled state for a first sheet type and setting the color restriction service to the disabled state for a second sheet type, wherein the color restriction print control unit operates only when the color printing restriction service has been set in the enabled state.

2. The print control device according to claim 1, wherein the print control device is used for controlling a printing device which is equipped with multiple color materials including black material and which exclusively uses the black material for the monochrome printing while using the multiple color materials for the color printing.

3. The print control device according to claim 1,
    wherein the color restriction print control unit causes the printing device to execute monochrome printing of the image corresponding to the print target data on the sheet in cases where the print target data is specified as data for monochrome printing, and
    wherein the color restriction print control unit causes the printing device to execute color printing of the image corresponding to the print target data on the sheet when the main data is judged to be color data by the main data color/monochrome judgment unit while causing the printing device to execute monochrome printing irrespective of whether the attached data is color data when the main data is judged not to be color data by the main data color/monochrome judgment unit in cases where the print target data is not specified as data for monochrome printing.

4. The print control device according to claim 1, further comprising an unconditional print control unit which operates when the color printing restriction service has been set in the disabled state and causes the printing device to execute printing of the image corresponding to the print target data on the sheet when the print target data is specified from outside,
    wherein the unconditional print control unit causes the printing device to execute monochrome printing of the image corresponding to the print target data on the sheet in cases where the print target data is specified as data for the monochrome printing, while causing the printing device to execute color printing in cases where the print target data is not specified as data for the monochrome printing.

5. The print control device according to claim 1, wherein the setting unit is configured to set the color printing restriction service in the enabled state when a signal requesting the enabling of the color printing restriction service is inputted via a user interface while setting the color printing restriction service in the disabled state when a signal requesting the disabling of the color printing restriction service is inputted via the user interface.

6. The print control device according to claim 1, wherein the setting unit is configured to set the color printing restriction service in the enabled state or the disabled state depending on an attribute of a user specifying the print target data.

7. The print control device according to claim 1, further comprising a classifying unit which classifies records forming the print target data, each of which represents a partial image of a print image represented by the print target data, into the main data and the attached data based on layout of the print image when the print target data is specified from outside,
    wherein the main data color/monochrome judgment unit is configured to judge whether the records forming the print target data and being classified as the main data by the classifying unit are color data.

8. The print control device according to claim 1,
    wherein the color printing restriction service is configured to allow a prescribed user to make settings on whether to disregard color of each type of attached image, and wherein the color restriction print control unit causes the printing device to execute printing of the image corresponding to the print target data while incorporating the settings made by the prescribed user.

9. A non-transitory computer readable medium having computer-readable instructions that cause a computer of an information processing device, that can communicate with a printing device configured to switch between color printing and monochrome printing, to implement:
 a main data color/monochrome judgment system configured to judge whether main data, included in print target data which is made up of the main data and attached data, is color data when the print target data is specified from outside;
 a color restriction print control system configured to cause the printing device to execute color printing of an image corresponding to the print target data on a sheet when the main data is judged to be color data by the main data color/monochrome judgment system, while causing the printing device to execute monochrome printing irrespective of whether the attached data is color data when the main data is judged not to be color data by the main data color/monochrome judgment system;
 a setting system configured to set a color printing restriction service in an enabled state or a disabled state depending on the type of the sheet on which the print target data is printed, the setting system setting the color restriction service to the enabled state for a first sheet type and setting the color restriction service to the disabled state for a second sheet type; and
 a switching system configured to allow the color restriction print control system to operate when the color printing restriction service has been set in the enabled state, while setting the color restriction print control system in a non-operating state when the color printing restriction service has been set in the disabled state.

10. The non-transitory computer readable medium according to claim 9,
 wherein the color restriction print control system causes the printing device to execute monochrome printing of the image corresponding to the print target data on the sheet in cases where the print target data is specified as data for the monochrome printing, and
 the color restriction print control system causes the printing device to execute color printing of the image corresponding to the print target data on the sheet when the main data is judged to be color data by the main data color/monochrome judgment system while causing the printing device to execute monochrome printing irrespective of whether the attached data is color data when the main data is judged not to be color data by the main data color/monochrome judgment system in cases where the print target data is not specified as data for the monochrome printing.

11. The non-transitory computer readable medium according to claim 9,
 further comprising computer-readable instructions that cause the computer to implement an unconditional print control system configured to cause the printing device to execute printing of the image corresponding to the print target data on the sheet when the print target data is specified from outside,
 wherein the unconditional print control system causes the printing device to execute monochrome printing of the image corresponding to the print target data on the sheet in cases where the print target data is specified as data for the monochrome printing, while causing the printing device to execute color printing in cases where the print target data is not specified as data for the monochrome printing, and
 wherein the switching system sets the unconditional print control system in the non-operating state and allows the color restriction print control system to operate when the color printing restriction service has been set in the enabled state, while setting the color restriction print control system in the non-operating state and allowing the unconditional print control system to operate when the color printing restriction service has been set in the disabled state.

12. The non-transitory computer readable medium according to claim 9,
 wherein the setting system sets the color printing restriction service in the enabled state when a signal requesting the enabling of the color printing restriction service is inputted via a user interface while setting the color printing restriction service in the disabled state when a signal requesting the disabling of the color printing restriction service is inputted via the user interface.

13. The non-transitory computer readable medium according to claim 9, wherein the setting system is configured to set the color printing restriction service in the enabled state or the disabled state depending on an attribute of a user specifying the print target data.

14. The non-transitory computer readable medium according to claim 9, further comprising computer-readable instructions that cause the computer to implement a classifying system configured to classify records forming the print target data, each of which represents a partial image of a print image represented by the print target data, into the main data and the attached data based on layout of the print image when the print target data is specified from outside,
 wherein the main data color/monochrome judgment system judges whether the records forming the print target data and being classified as the main data by the classifying system are color data.

15. The non-transitory computer readable medium according to claim 9,
 wherein the color printing restriction service is configured to allow a prescribed user to make settings on whether to disregard color of each type of attached image, and
 wherein the color restriction print control system causes the printing device to execute printing of the image corresponding to the print target data while incorporating the settings made by the prescribed user.

16. A print control device for controlling a printing device, which is configured to switch between color printing and monochrome printing, to cause the printing device to print an image corresponding to print specified target data on a sheet, the print specified target data including main data and a plurality of pieces of sub-data, each of the plurality of pieces of sub-data being able to be set as one of a part of the main data and a part of attached data, comprising:
 a main data color/monochrome judgment unit configured to judge whether the main data, included in the print target data which includes the main data and the attached data, is color data when the print target data is specified; and
 a color restriction print control unit configured to cause the printing device to execute color printing of the image corresponding to the print target data on the sheet when the main data color/monochrome judgment unit judges that the main data is color data, the color restriction print control unit causing the printing device to execute monochrome printing irrespective of whether the attached data is color data when the main data color/monochrome judgment unit judges that the main data is not color data, wherein the main data color/monochrome judgment unit judges that the main data is color data, when there exists at least one piece of the plurality of pieces of sub-data, the at least one piece of the plurality of pieces of sub-data being set as a part of the main data and being color data, or, when the main data other than the plurality of pieces of sub-data is color data, and wherein the main data color/monochrome judgment unit judges that the main data is not color data, when each of the plurality of pieces of sub-data being set as a part of the main data is not color data and the main data other than the plurality of pieces of sub-data is not color data.

* * * * *